US007650443B1

(12) United States Patent
Cavanagh, Jr. et al.

(10) Patent No.: US 7,650,443 B1
(45) Date of Patent: Jan. 19, 2010

(54) METHODS AND APPARATUS FOR ALLOCATING ACCESS TO A HOST DEVICE BUFFER

(75) Inventors: Edward T. Cavanagh, Jr., Norristown, PA (US); William Oldham, Pottstown, PA (US)

(73) Assignee: Unisys Corporation, Blue Bell, PA (US)

( * ) Notice: Subject to any disclaimer, the term of this patent is extended or adjusted under 35 U.S.C. 154(b) by 374 days.

(21) Appl. No.: 10/896,562

(22) Filed: Jul. 22, 2004

(51) Int. Cl.
*G06F 3/00* (2006.01)
*G06F 13/12* (2006.01)

(52) U.S. Cl. .............................. 710/52; 710/37; 710/38; 710/62

(58) Field of Classification Search ........................ None
See application file for complete search history.

(56) References Cited

U.S. PATENT DOCUMENTS 6,526,068 B2 * 2/2003 Smith .......................... 370/474
7,188,198 B2 * 3/2007 Beukema et al. .............. 710/52
2003/0223416 A1 * 12/2003 Rojas et al. .................. 370/389
2004/0064664 A1 * 4/2004 Gil .............................. 711/170
2005/0027906 A1 * 2/2005 Peterson et al. .............. 710/52

OTHER PUBLICATIONS

Ajay V. Bhatt; "Creating a Third Generation I/O Interconnect"; Intel Developer Network for PCI Express Architecture, pp. 1-11; www Express-lane.org.

* cited by examiner

*Primary Examiner*—Alan Chen
(74) *Attorney, Agent, or Firm*—Richard J. Gregson; Robert P. Marley; RatnerPrestia

(57) ABSTRACT

Methods and apparatus for allocating access to a buffer of a host device to buffer data transferred between a controller of the host device and one or more remote devices are disclosed. The host device is configured to couple to each of the one or more remote devices through one or more corresponding dedicated lanes. Buffer access is allocated by determining, for each of one or more remote devices coupled to the host device, a number of dedicated lanes between the host device and each of the one or more remote devices and allocating access to the buffer of the host device for each of the one or more remote devices responsive to the determined number of dedicated lanes.

7 Claims, 7 Drawing Sheets

METHODS AND APPARATUS FOR ALLOCATING ACCESS TO A HOST DEVICE BUFFER

FIELD OF THE INVENTION

The present invention relates to the field of computer architecture and, more specifically, to methods and apparatus for allocating access to a host device buffer.

BACKGROUND OF THE INVENTION

There is ever-increasing demand for higher input/output (I/O) bandwidth to interconnect electronic devices. PCI-Express is a leading contender for delivering much higher I/O bandwidth than is available in conventional computing platforms. PCI-Express uses dedicated lanes between pairs of electronic devices rather than a conventional data bus through which all data for multiple electronic devices is routed.

In a PCI-Express system, I/O bandwidth of a host device may be divided among multiple remote devices through the allocation of dedicated lanes. For example, a host device with a PCI-Express connection having 16 dedicated lanes may allocate 8 of those lanes for communication with one remote device and another 8 lanes for communication with another remote device. In this example, the I/O bandwidth for the host device is equally divided between the two remote devices.

The host device needs to buffer data transmitted to the remote devices and received from the remote devices. A proposed host device buffering solution includes using separate transmit/receive buffers for each remote device. In this proposed solution, the host device would include a transmit and receive buffer pair for each I/O connection port of the host device through which a remote device can communicate with the host device. This approach has two drawbacks. First, multiple buffers require multiple address decode blocks that increases overall silicon usage, which is a precious computer architecture commodity. Second, transmit and receive buffer pairs go unused when a remote device is not coupled to I/O connection ports associated with those buffer pairs, thus wasting buffering capacity.

Cost and speed are two critical factors in the success of a computer architecture. Buffering solutions affect the cost and speed of the computer architecture. Improvements in cost and speed may be obtained by reducing silicon usage and efficiently using buffering capacity. Accordingly, improved buffering solutions that are not subject to the above limitations are needed. The present invention addresses this need among others.

SUMMARY OF THE INVENTION

The present invention is embodied in methods and apparatus for allocating access to a buffer of a host device to buffer data transferred between a controller of the host device and one or more remote devices. The host device is configured to couple to each of the one or more remote devices through one or more corresponding dedicated lanes. Buffer access is allocated by determining, for each of one or more remote devices coupled to the host device, a number of dedicated lanes between the host device and each of the one or more remote devices and allocating access to the buffer of the host device for each of the one or more remote devices responsive to the determined number of dedicated lanes.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. Included in the drawings are the following figures.

DETAILED DESCRIPTION OF THE INVENTION

Figure 1:
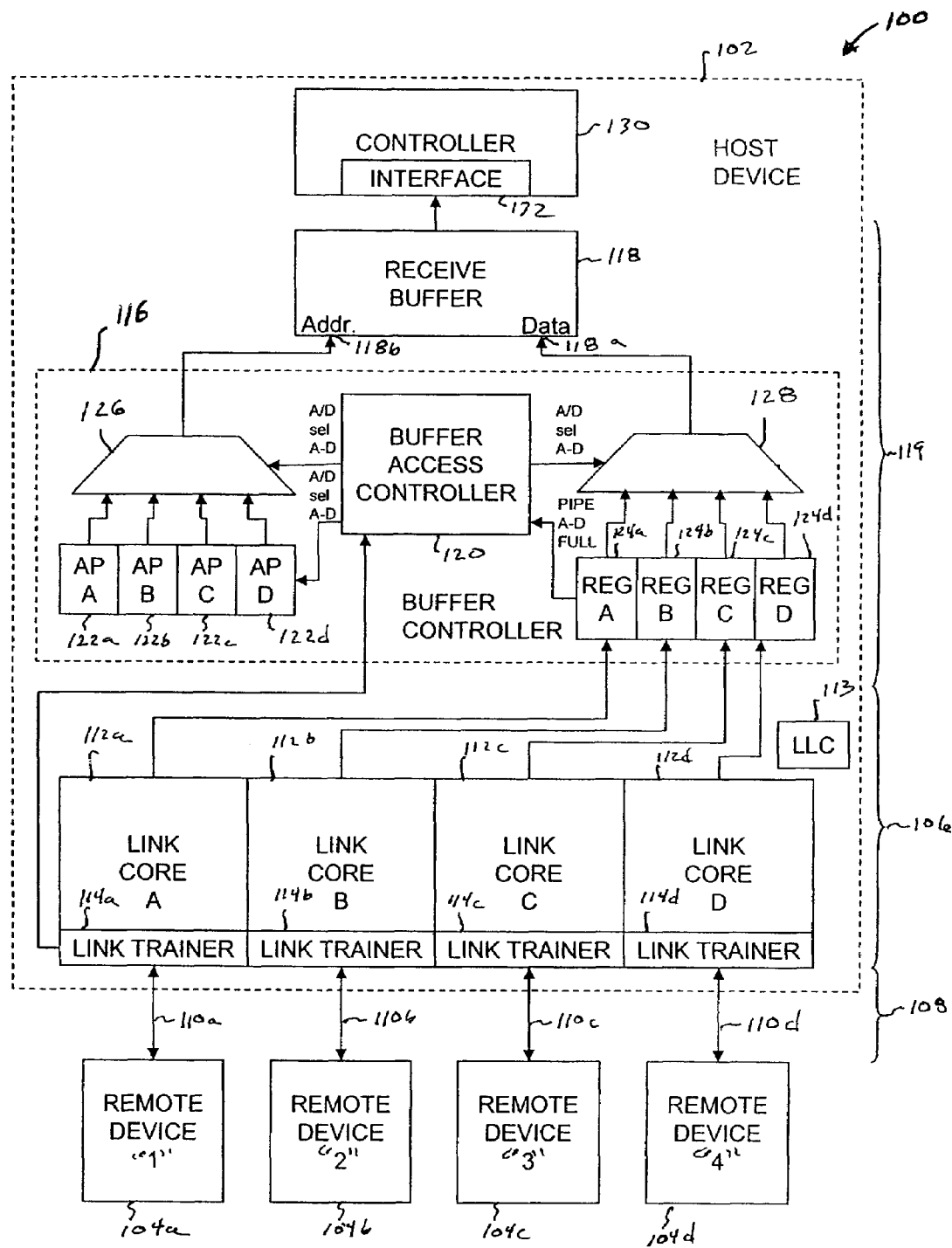
FIG. 1 is a block diagram of an exemplary receive architecture for buffering data received from one or more remote devices at a host device in accordance with the present invention.

FIG. 1 depicts an exemplary receive architecture 100 for describing the use and control of a receive buffer in accordance with one aspect of the present invention. An exemplary transmit architecture for describing the use and control of a transmit buffer in accordance with another aspect of the present invention is described below with reference to FIG. 2. The exemplary receive and transmit architectures enable dynamic allocation of a single receive buffer and a single transmit buffer, respectively, to buffer data between a host device and one or more remote devices based on the numbers of remote devices and the number of dedicated lanes (bandwidth) in links with those remote devices.

Referring to FIG. 1, a host device 102 communicates with one or more remote devices (represented by remote devices 104a-d). The host device 102 and the remote devices 104 may be processing devices such as personal computers and/or conventional input/output (I/O) devices such as printers, monitors, keyboards, or other such devices. Although connections for four remote devices 104 are illustrated and described below, fewer or more connections for connecting to remote devices may be employed. In addition, one or more of the remote devices may be a switch that indirectly couples the host device to two or more other remote devices.

The remote devices 104 communicate with the host device 102 thorough a link layer 106 of the host device 102. A physical layer 108 couples the remote devices 104 to the link layer 106 of the host device 102. The physical layer 108 includes a plurality of dedicated lanes, which form links (represented by links 10a-d) between the host device 102 and the remote devices 104. Each link includes one or more dedicated lanes with the number of dedicated lanes within a link corresponding to the bandwidth of that link. For example, a link with eight dedicated lanes has approximately twice the bandwidth of a link with four dedicated lanes. In an exemplary embodiment, the dedicated lanes are PCI-Express lanes in which each dedicated lane includes two differentially driven pairs of signals, i.e., a transmit pair and a receive pair. Additional details regarding PCI-Express are found in the complete PCI-Express Reference—Design Insights for Hardware and Software Developers, by Edward Solari and Brad Congdon, available from Intel Press ©2003 Intel Corporation, which is incorporated fully herein by reference. For illustrative purposes sixteen dedicated lanes are described below, however, fewer or more dedicated lanes may exist between the host device 102 and the remote devices 104.

The link layer 106 includes a plurality of link cores (represented by link cores 112a-d) and a link layer clock (LLC) 113. In an exemplary embodiment, each link core 112 is configured to establish direct communication with one remote device 114 through a respective link 110. Thus, if there are four link cores 112, the host device 102 can communicate directly with four remote devices 104 (and with more remote devices indirectly if one or more of the four remote devices 104 is a switch). The link layer clock 113 regulates the timing of components within the link layer 106. In an exemplary embodiment, the link layer clock is derived from data on the physical layer 108.

Each link core 112 within the link layer 106 includes a corresponding link trainer (represented by link trainers 114a-d). The link trainers 114 individually communicate with the remote devices 104 coupled to their corresponding links 110 to determine a number of dedicated lanes to be allocated to each remote device 104. In an exemplary embodiment, the link trainers "negotiate" with the remote devices to determine the number of dedicated lanes requested by each remote device 104. The link trainers 114 then communicate lane allocation signals corresponding to the number of dedicated lanes requested by each remote device to a buffer controller 116 coupled to the link trainers 114.

The buffer controller 116 controls access to a receive buffer 118, which serves as the buffer for data received from each of the remote devices 104. The buffer controller 116 and the receive buffer 118 are part of a transaction layer 119 within the host device 102 for passing data between the link layer 106 and a controller 130 (described below) of the host device 102. The illustrated buffer controller 116 includes a buffer access controller 120, address pointers (represented by address pointers "AP" 122a-d), pipeline registers (represented by pipeline registers "REG" 124a-d), an address multiplexer 126, and a data multiplexer 128. In an exemplary embodiment, each link core 112 has a corresponding pipeline register 124 to which data entering a link core 112 through a link 110 from a particular remote device 104 passes. For example, data from remote device "1" entering link core A passes to pipeline register "REG" A 124a. In an exemplary embodiment, the link layer clock 113 regulates the timing of components within the buffer controller 116 in addition to the link layer components. In accordance with this embodiment, the link layer 106 and the transaction layer 119 are synchronous, thus avoiding difficulties inherent to handling data passing through asynchronous link layer/transaction layer boundaries.

The pipeline registers 124 are coupled to the buffer access controller 120. In an exemplary embodiment, the pipeline registers 124 enable the receive architecture 100 to accept data from all dedicated lanes concurrently regardless of how the dedicated lanes are distributed within the links 110. When a pipeline register (e.g., REG A) is loaded with data from a corresponding remote device (e.g., remote device "1" 104a) it generates a signal indicating that it is full. In an exemplary embodiment, when full, each pipeline register generates its own full signal (e.g., PIPE A FULL, PIPE B FULL, PIPE C FULL and PIPE D FULL, collectively PIPE A-D FULL), which is passed to the buffer access controller 120.

The buffer access controller 120 allocates access to the receive buffer 118 by the data in the pipeline registers 124 and, thus, by the remote devices 104 coupled to the individual link cores 112 through their corresponding links 110. As described in further detail below, with reference to the timing diagrams of FIGS. 3-7, the buffer access controller 120 allocates access to the receive buffer 118 by the remote devices 104 based on the number of dedicated lanes in each link between the host device 102 and corresponding remote devices 104 coupled to the host device 102. In an exemplary embodiment, access is allocated by assigning time slots for accessing the receive buffer to data from the individual link cores and, equivalently, the remote devices.

The receive data multiplexer 128 is coupled between the pipeline registers 124 and the receive buffer 118 to control which pipeline registers 124 pass data to a data port 118a of the receive buffer 118. The data multiplexer 128 is further coupled to the buffer access controller 120. The buffer access controller 120 generates a selection signal corresponding to each pipeline register 124 (e.g., A/D sel A, A/D sel B, A/D sel C, and A/D sel D, collectively A/D sel A-D) indicating which of the pipeline registers 124 is to pass data to the receive buffer 118. When the buffer access controller 120 selects a particular pipeline registers 124 to pass data through the data multiplexer 128, the data within that pipeline registers 124 is transferred to the receive buffer 118.

The address pointers 122 point to addresses within the receive buffer 118. In an exemplary embodiment, the address pointers 122 effectively divide (apportion) the receive buffer into sections (i.e., through designated address ranges), with each section corresponding to a different link core 112 and, thus, remote device 104. The address pointers 122 are coupled to the buffer access controller 120 and are selectively incremented within the designated ranges as data is written to the receive buffer 118. The selection signals used by the buffer access controller 120 to control the receive data multiplex (e.g. A/D sel A-D) may also be used to increment the address pointers 122. For example, a first address pointer (e.g., address pointer "AP" A) may point to a first initial address for data passing through a first link core (e.g., link core A 112a) and a second address pointer (e.g., address pointer "AP" B) may point to a second initial address for data passing through a second link core (e.g., link core B). In response to a selection signal for link core A (e.g., A/D sel A), the first address pointer is incremented within the range designated for the first link core.

In an exemplary embodiment, the ranges designated by the address pointers 122 are defined by the buffer access controller 120 based on the bandwidth (i.e., number of dedicated lanes) of the individual links. The ranges may be proportionally assigned based on the bandwidth of the links. For example, if the link to link core A has twice as many dedicated lanes as the link to link core B, link core A may have a larger range within the receive buffer 118 than link core B, e.g., twice as much.

The address multiplexer 126 is coupled between the address pointers 122 and the receive buffer 118 to control which address pointer 122 passes an address to an address (Addr) port 118b of the receive buffer 118. The address multiplexer 126 is further coupled to the buffer access controller 120. The buffer access controller 120 generates a signal corresponding to each address pointer (e.g., A/D sel A-D), which may be the same signal used to control the data multiplexer 128, identifying the address pointer 122 that is to pass an address to the address port 118b of the receive buffer 118.

When a particular address pointer 122 is identified by the buffer access controller 120 to pass an address through the address multiplexer 128, the address of that address pointer is transferred to the address port 118b of the receive buffer 118.

In an exemplary embodiment, a flow control credit tracker (not shown) in the host device 102 issues credits to the receive devices 104 to send data to the host device 102. The flow control credit tracker issues credits only if there is room in the receive buffer 118 and, thus, in normal operating conditions, data in the receive buffer is not overwritten before it is read by a controller 130 within the host device 102 (a condition referred to herein as "overrun"). In an alternative exemplary embodiment, the receive buffer is be sized (e.g., "oversized") to avoid overrun. PCI-Express is a flow control credit tracking system.

The controller 130 within the host device 102 communicates with the receive buffer 118 through an interface 132 such as the front side bus of a processor. A suitable controller 130 and interface 132 for use with the present invention will be understood by those of skill in the art from the description herein.

Figure 2:
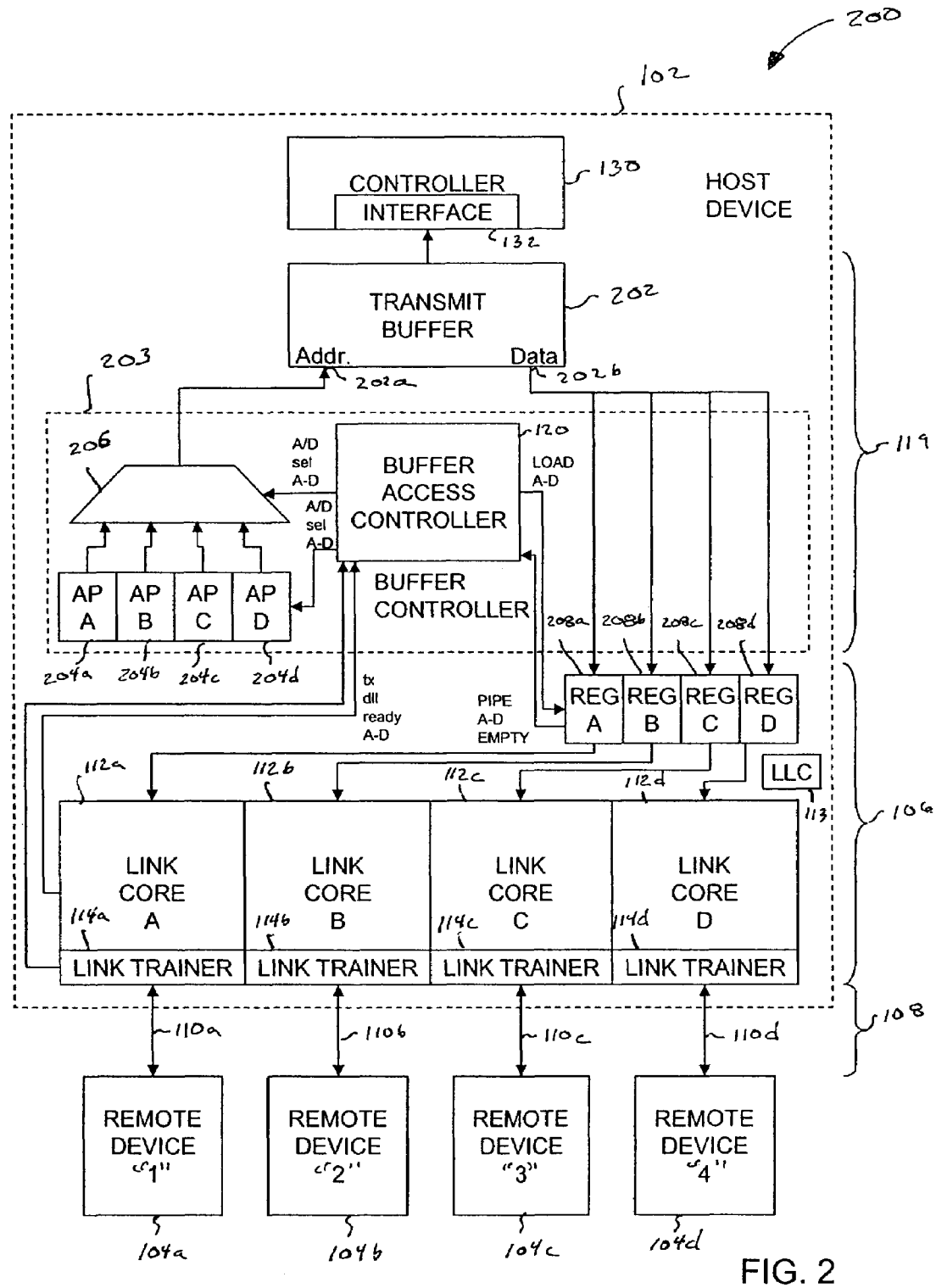
FIG. 2 is a block diagram of an exemplary transmit architecture for buffering data to be transmitted from a host device to one or more remote devices in accordance with the present invention.

FIG. 2 depicts an exemplary transmit architecture 200 for describing the use and control of a transmit buffer 202 in accordance with another aspect of the present invention. The exemplary transmit architecture 200 shares many components of the receive architecture 100 (FIG. 1), with like components having the same numbers. In addition, the shared components perform many of the same functions. For example, the link trainers 114 are the same in both the receive and transmit architectures 100 and 200 and perform the same function of informing the buffer access controller 120 of the number of dedicated lanes in each link 104 coupled to a respective link core. Components and functionality in the transmit architecture 200 where overlap exists with the receive architecture 100 (FIG. 1) are not described in detail.

As described above, the link trainers 114 within each link core 112 generate signals corresponding to the number of dedicated lanes within each link. Additionally, the link cores 112 each generate a transmit ready signal (e.g., tx_dll_ready_A, tx_dll_ready_B, tx_dll_ready_C, and tx_dll_ready_D, collectively tx_dll_ready_A-D) indicating when they are ready to transmit data over the physical layer 108 to the remote devices 104.

The transmit buffer 202 buffers data received from the controller 130 through the interface 132 for delivery to the remote devices 104. The transmit buffer 202 includes an address port 202a and a data port 202b. A buffer controller 203 controls access to the transmit buffer 202.

The illustrated buffer controller 203 includes the buffer access controller 120, a plurality of address pointers (represented by address pointers "AP" 204a-d), and a transmit address multiplexer 206. The buffer access controller 120 controls the address for reading data from the transmit buffer 202 using the address pointers 204 and a transmit address multiplexer 206 coupled to the address port 202a of the transmit buffer 202. The buffer access controller 120 controls access to the transmit buffer to retrieve data for transmission to the remote devices 104 based on the number of dedicated lanes in each of the links coupling the remote devices to the link cores.

The address pointers 204 and address multiplexer 206 operate in essentially the same manner as the address pointers 122 (FIG. 1) and address multiplexer 126 in the receive architecture 100 described above with reference to FIG. 1 with the exception that the address ranges in the address pointers 204 may be different, e.g., to accommodate differences in memory size between the receive buffer and the transmit buffer.

Transmit pipeline registers (represented by pipeline registers "REG" A-D 208a-d) coupled to the transmit buffer 202 store data from the transmit buffer 202 for delivery to the link cores 112. Each pipeline registers 208 is configured to receive a load signal (e.g., LOAD A, LOAD B, LOAD C, AND LOAD D, collectively LOAD A-D) at a respective load port, which causes the pipeline registers to load data from the transmit buffer 202. In addition, each pipeline register is configured to generate a pipeline empty indicator (e.g., PIPE A EMPTY, PIPE B EMPTY, PIPE C EMPTY, and PIPE D EMPTY, collectively PIPE A-D EMPTY) indicating when it is empty. Data in the pipeline registers is loaded to the link cores 112 and passed over the links 110 of the physical layer 108 to the remote devices 104. The pipeline registers can be considered part of the link layer 106 and/or part of the buffer controller 203.

The buffer access controller 120 allocates access to the transmit buffer 202 for data passing to the remote devices. As described in further detail below with reference to the timing diagrams of FIGS. 8 and 9, the buffer access controller 120 allocates access to the transmit buffer 202 based on the number of dedicated lanes in each link between the host device and the corresponding remote device coupled to the host device. In an exemplary embodiment, access may be allocated by assigning time slots for accessing the transmit buffer for data passing to the individual link cores and, equivalently, the remote devices.

The buffer access controller 120 generates signals that control the address pointers 204 and the transmit data multiplexer 206 (e.g., A/D sel A-D). In addition, the buffer access controller 120 generates the load signals for the pipeline registers (e.g., LOAD A-D). In an exemplary embodiment, the load signals instruct the pipeline registers to load data from the transmit buffer when an address for a pipeline register is selected. If the transmit ready signal is coincident with the load signal, data is forwarded to the link core Conversely, in the absence of the transmit ready signal, data is held in the pipeline register and the pipeline full signal is set. In the illustrated embodiment, the buffer access controller 120 is used in both the receive architecture 100 (FIG. 1) and the transmit architecture 200. In an alternative exemplary embodiment, separate buffer access controllers may be used.

Additional implementation details for buffering data received from remote devices 104 are now provided with reference to the receive architecture 100 of FIG. 1 and access to the receive buffer 118 is further described with reference to the timing diagrams of FIGS. 3-7. The implementation details are provided using a PCI-Express physical layer, four (4) links 110, sixteen (16) available dedicated lanes, and a 128× 1536 buffer capable of buffering 1536 quad-words.

Table 1 illustrates an exemplary usage of time slots for controlling access to the receive buffer 118 based on the number of dedicated lanes (bandwidth) associated with each link 110 to a link core 112 for six different configurations. In order to provide access for up to four remote devices coupled to one of the four (4) link cores 112 in the illustrated embodiment, four time slots (TS 1-4) are used. In Table 1, 4× represents 4 dedicated lanes, 8× represents 8 dedicated lanes, and 16× represents 16 dedicated lanes.

TABLE 1

| Row | LINK BANDWIDTH | | | | TIME SLOT ACCES | | | |
|---|---|---|---|---|---|---|---|---|
| | A | B | C | D | TS1 | TS2 | TS3 | TS4 |
| 1 | 4X | 4X | 4X | 4X | A | B | C | D |
| 2 | 8X | 4X | 4X | — | A | B | A | C |
| 3 | 8X | 8X | — | — | A | B | A | B |
| 4 | 4X | 8X | 4X | — | A | B | C | B |
| 5 | 4X | 4X | 8X | — | A | C | B | C |
| 6 | 16X | — | — | — | A | A | A | A |

With reference to Table 1, the first row illustrates that when all links 110 have the same bandwidth (e.g., 4 dedicated lanes per link), each link to a link core is assigned one of four time slots. Thus, data received through each link has access to the receive buffer and, assuming the time slots are equal, the data received through each link has the same amount of access to the receive buffer. As shown in the second row, when the link to link core A has twice the bandwidth of the links to link core B and link core C (and link core D handles no bandwidth), the link to link core A is assigned two time slots for every time slot the links to link core B or link core C are assigned. In the fourth and fifth rows, which have a similar timing scheme to the second row, the link with twice the bandwidth of the other links is assigned twice the time slots. As shown in the third row, when the links to link core A and link core B equally share all the bandwidth, each of these links is assigned half of the time slots. As shown in the sixth row, when one link requires all the available bandwidth, that link is assigned all the time slots. Thus, as shown in Table 1, the time slots are proportionally assigned to the links such that access to the receive buffer for the remote devices connected to the host device is proportionally allocated based on the number of dedicated lanes for each remote device (i.e., their connection bandwidth).

The buffering scheme of the receive architecture 100 is adaptable to links with various numbers of dedicated lanes. PCI-Express requires that the receive buffer be able to receive data concurrently from all sixteen (16) dedicates lanes regardless of whether those lanes are configured as a single link or as two or more independent links. In order to support a remote device that requires 16 dedicated lanes (i.e., 16×) in a PCI-Express system, one of the link cores (e.g., link core A) should be capable of an aggregated 4 GB/second data rate for the sixteen dedicated lanes. To achieve a 4 GB/second data rate, the receive buffer 118 should be able to write a quad-word (128 bits) of data once per cycle of a link layer clock (LLC 113) running at 250 MHz. When a 16× link is present, all capacity is assigned to one link. A 4× link requires a quarter of this capacity and an 8× link requires half of this capacity. If link core A is capable of handling a 16× link, the remaining link cores may operate at lower data rates because they need handle only the capacity of the dedicated lanes not handled by link core A, which will be less than 16×. Thus, if link core A is coupled to one or more dedicated lanes, fifteen or fewer dedicated lanes would be coupled to link core B. Assuming that the links include 0×, 4×, 8×, or 16× dedicated lanes only, and the link with the most dedicated lanes is coupled to link core A, all remote device combinations could be handled with link core A capable of handling 4 GB/second, link core B capable of handling 2 GB/second and each of link cores C and D capable of handling 1 GB/second.

The pipeline registers 124 buffer data from the link cores 112, which, in an exemplary embodiment, do not stall and/or buffer data received over the links 110. It is contemplated that if each link core were associated with its own receive buffer, as opposed to using a single receive buffer as in the present invention, that the pipeline registers 124 could be omitted. Since the communicated data would typically include a multi-byte header and error correction codes (EEC), however, pipeline registers would still be needed for EEC and for stripping the header to direct the data to the proper receive buffer. Thus, in practice, no additional pipelining is needed for the single receive buffer of the present invention over what would be needed for header/EEC handling in a multiple receive buffer system.

The pipeline registers 124 each generate a signal indicating when data is available in a particular pipeline register. For example, when pipeline register A is loaded with data from link core A, a pipeline full signal generated by pipeline register A (e.g., PIPE A FULL) transitions to true (e.g., "logic-high"). Conversely, when data is passed from pipeline register A through the multiplexer 128 to the receive buffer, the pipeline full signal transitions to false (e.g., "logic-low"). The remaining pipeline registers B-D produce similar signals indicating if they are full. The pipeline full sign al may be expressed as PIPE x FULL when referring to a non-specific one or more pipeline full signals.

The buffer access controller 120 generates an address/data selection signal corresponding to each link core responsive to the link layer clock signal (e.g., Clk) and the time slots assigned to that link core (see Table 1). For example, the buffer access controller 120 causes an address selection signal for link core A (e.g., A/D sel A) to transition to true (e.g., "logic-high") for a clock cycle during a time slot associated with link core A. Conversely, after the time slot associated with link core A passes, the buffer access controller 120 causes the address selection signal for link core A to transition to false (e.g., "logic-low"). The buffer access controller may produce similar address/data selection signals associated with the remaining link cores B-D. The address selection signal may be expressed as A/D sel x when referring to a non-specific one or more address/data selection signals.

The receive buffer 118 for a host device having a 16× link to a remote device functions essentially as a dedicated buffer. With a 16× link, the entire receive buffer is allocated to a single link core (i.e., link core A) and the speed at which data is written into the receive buffer matches the speed/bandwidth of the link. When available, data is loaded into pipeline register A and written to the receive buffer 118 every clock cycle, which would cause the pipeline full signal (e.g., PIPE A FULL) to transition to an active state at the start of a data transfer and remain in the active state until the transfer is complete. In this example, an address/data selection signal (e.g., the A/D sel A) would be in a constant active state.

Figure 3:
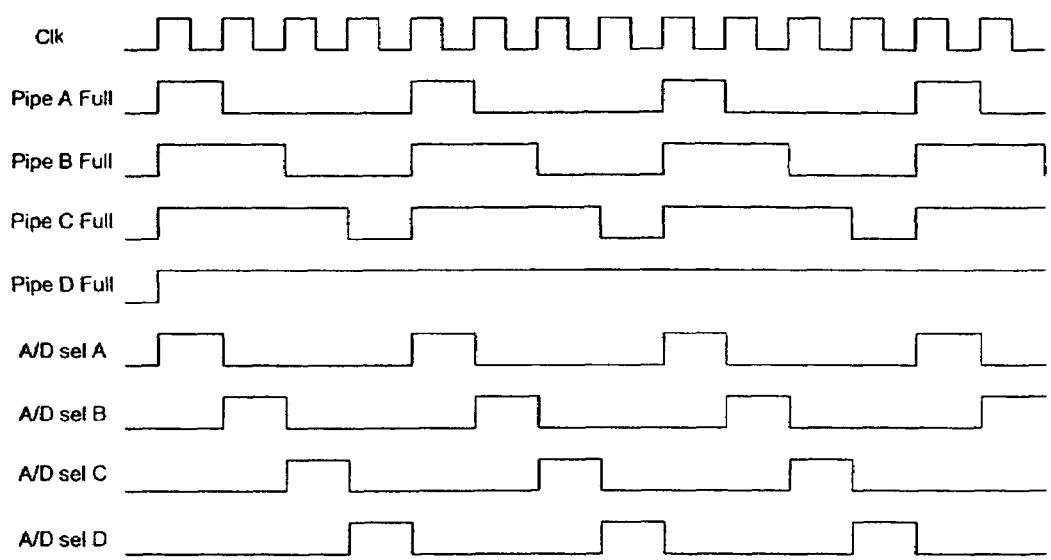
FIGS. 3, 4, 5, 6, and 7 are exemplary buffer access timing diagrams for different configurations of the receive architecture of FIG. 1 in accordance with the present invention.

Access to receive buffer 118 when configured with four 4× links to four remote devices is now described with reference to the timing diagram of FIG. 3. In this configuration, each link core A-D negotiates a link with 4× dedicated lanes. In an exemplary embodiment, the receive buffer 118 is effectively divided into fourths (e.g., by the buffer access controller 120 and address pointers 122) with data received through each link core having equal access to an equal portion of the receive buffer 118. The timing diagram in FIG. 3 shows a worst case synchronization scenario in which data from all 4 links is loaded into their associated pipeline register 124 on the same clock cycle. Each PIPE x FULL signal transitions to true (e.g., "logic-high") when data is loaded into the pipeline register from the link cores. Data in a pipeline register is then stored in the receive buffer 118 on the leading edge of the clock signal (Clk) after the A/D sel x signal and the PIPE x FULL signal for that pipeline register transitions to true. As shown by the PIPE D FULL signal, it is possible for the pipeline register to load and to write to the receive buffer on the same clock signal. Therefore, after it is initially set, it is possible for a pipeline full signal such as PIPE D FULL, to remain true (e.g., "logic-high") for the remainder of the data transfer. The timing diagram shows A/D sel A being coincident with the loading of all registers, however, any of the A/D sel x signals could have occurred at this point and the pattern would have been essentially the same.

Any or all of the PIPE x FULL signals could resemble the PIPE D FULL signal. The solid active PIPE D FULL signal occurs if link core D has data available on the same clock that pipeline register D and its address are selected to write to the receive buffer. Instead of all interfaces being ready at the same time, they all could have just missed a write opportunity when they loaded their pipeline register. Using the receive architecture of the present invention, this can occur without losing any data and with no need to "stall" the pipeline registers.

Access to the receive buffer 118 when configured with an 8× link to one remote device and 4× links to two other remote devices is now described with reference to the timing diagrams of FIGS. 4 and 5. The receive buffer 118 in this configuration is effectively allocated such that the 8× link remote device has access to the receive buffer twice as often as the other two remote devices. In an exemplary embodiment, the 8× link remote device has access to half of the receive buffer (which is apportioned through addressing) and the two other remote devices each have access to one quarter of the receive buffer.

In this configuration, link core A negotiates a link with 8× dedicated lanes, link core B negotiates a link with 4× dedicated lanes, link core C negotiates a link with 4× dedicated lanes, and link core D has no dedicated lanes. Since there are no remaining dedicated lanes after link cores A-C negotiate their access, link core D is inactive. The logic for link core D is present, but goes unused. The access time and address ranges within the receive buffer that would have been allocated to link core D is allocated to link core A since link core A has a higher bandwidth requirement than link cores B and C. Having a larger buffer area within the receive buffer for data received through link core A is useful since link core A will potentially receive twice as much data in one time interval as either of link cores B or C.

Figure 4:
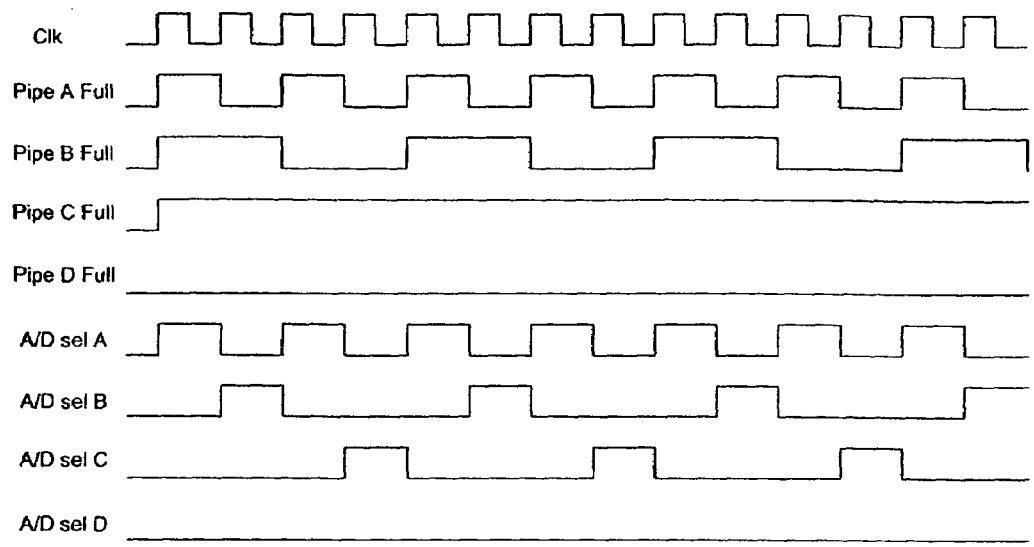

Referring to FIG. 4, all three link cores load their respective pipeline registers on the same clock signal (e.g., Clk). The PIPE x FULL signals associated with these three link cores transitions to true (e.g., "logic-high") when the data is loaded from the link core to the associated pipeline register. The data from the individual pipeline registers is then stored in the receive buffer 118 on the leading edge of the clock signal after the associated A/D sel x signal and PIPE x FULL signal transition to true. For example, the data from pipeline register A is loaded to the receiver buffer on the leading edge of the clock signal after A/D sel A and PIPE A FULL transition to true. Since pipeline register A (REG A) is fed by an 8× link, it fills at twice the frequency of the other two links. Thus, the address pointers associated with pipeline register A are selected twice as often for the 8× link as for each of the 4× links.

Figure 5:
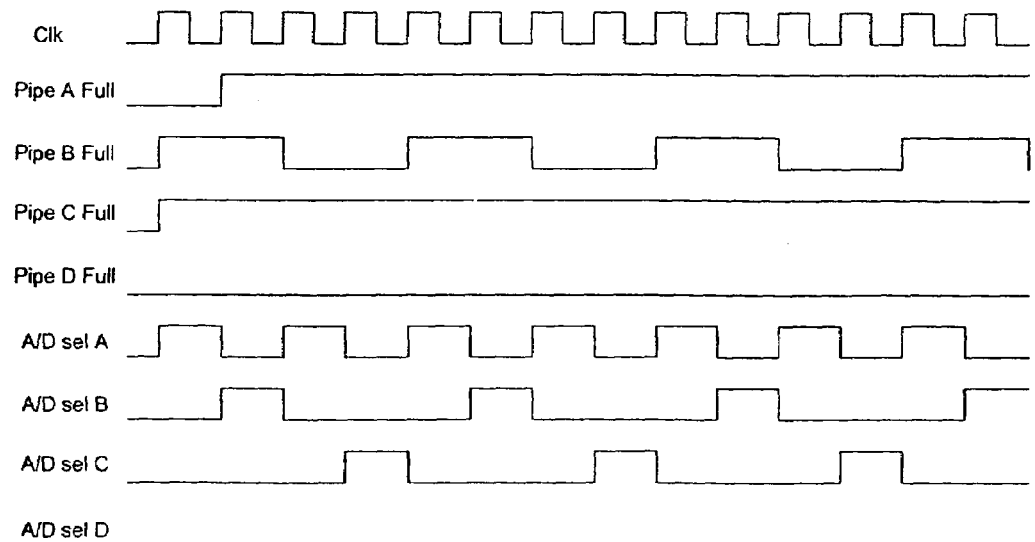

FIG. 5 illustrates the result of data of link core A missing its associated time slot by one clock cycle. In this case, the PIPE A FULL signal has a constant high value like the PIPE C FULL signal in FIG. 4 because pipeline register A needs to hold the data for the one clock period when A/D sel A is not selected.

Access to the receive buffer when configured with two 8× link remote devices is now described with reference to the timing diagrams of FIGS. 6 and 7. The receive buffer 118 in this scenario is effectively divided such that the remote devices associated with each 8× link have access to half the time slots and, thus, have equal access to the receive buffer. In an exemplary embodiment, each remote device also has access to half the receive buffer. In this configuration, both link core A and link core B negotiate a link with 8× dedicated lanes and link cores C and D have no dedicated lanes. Since there are no remaining dedicated lanes after link cores A and B negotiate their access, link cores C and D are inactive. The buffer space which would have been allocated to link cores C and D is allocated to link cores A and B.

Figure 6:
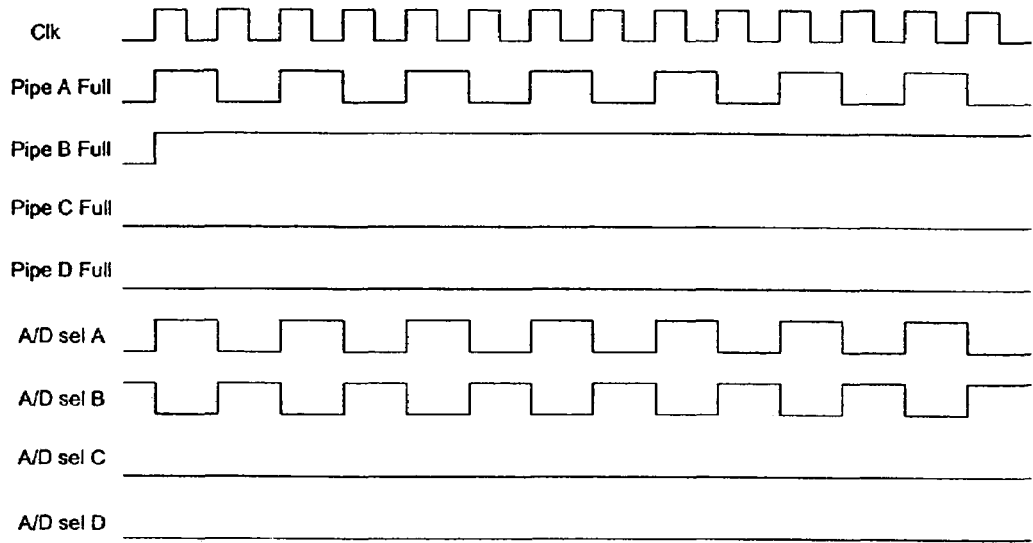
Figure 7:
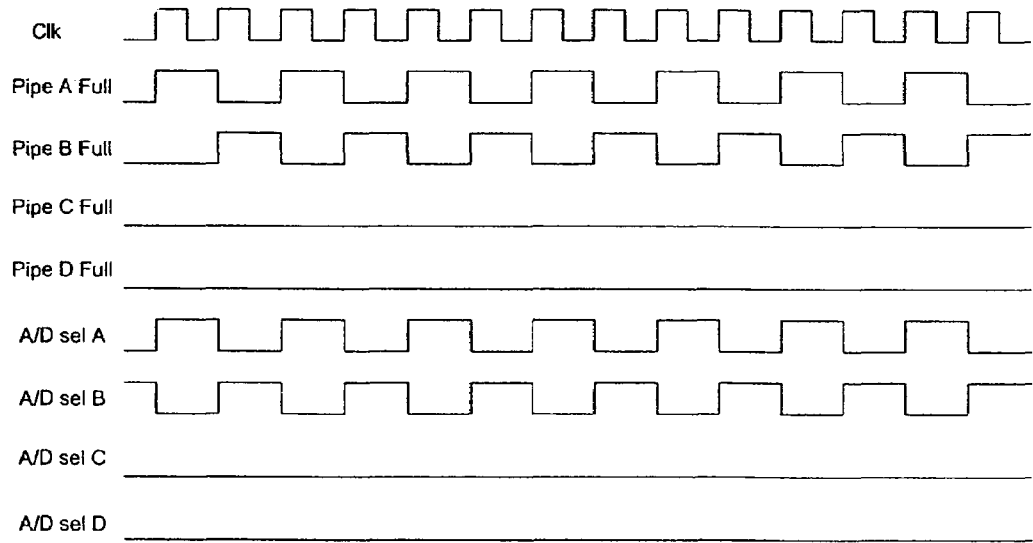

The timing diagram in FIG. 6 shows an exemplary time division when registers associated with both link cores fill on the same clock signal (e.g., Clk). The PIPE x FULL signals associated with the two link cores transition to true when data is loaded from the link core to the associated pipeline register. The data from the individual pipeline registers is then stored in the receive buffer 118 on the leading edge of the clock signal after the associated A/D sel x signal and the PIPE x FULL signal transition to true. In this example, the PIPE A FULL signal can be considered in-phase with its link core and the PIPE B FULL signal can be considered out-of-phase with its link core. Since the link cores are totally independent, the other possibilities are that the PIPE A FULL signal could be out-of-phase and the PIPE B FULL signal could be in-phase, they both could be in-phase (see FIG. 7), or they both could be out-of-phase with their link cores.

Additional implementation details for buffering data for transmission to the remote devices 104 are now provided with reference to the transmit architecture 200 of FIG. 2 and access to the transmit buffer 202 is further described with reference to the timing diagrams of FIGS. 8 and 9. As for the receive architecture 100 (FIG. 1), the implementation details for the transmit architecture 200 are provided using a PCI-Express physical layer, four (4) links 110, and sixteen (16) available dedicated lanes. In an exemplary embodiment, the transmit buffer is a 128×1024 buffer capable of buffering 1024 quad-words.

The buffering scheme of the transmit architecture 200 is adaptable to links with various numbers of dedicated lanes similar to the receive architecture 100 (FIG. 1). PCI-Express requires that the transmit buffer be able to send data concurrently from all sixteen (16) dedicated lanes regardless of whether those lanes are configured as a single link or as two or more independent links. In order to support a 16× link, at least one link core (e.g., link core A) must be capable of an aggregated 4 GB/second data rate of the sixteen dedicated lanes. To achieve this rate, the transmit buffer 202 should be able to write a quad-word (128 bits) of data once per cycle of a link layer clock (LLC 113) running at 250 MHz.

It is contemplated that if each link core were associated with its own transmit buffer that the pipeline registers 208 would be unnecessary. Since most data includes a multi-byte header and optional ECC data, however, pipeline registers are already employed for header/EEC handling. Thus, as with the receive buffer, in practice, no additional pipelining is needed for the single transmit buffer of the present invention over what would be needed for header/ECC handling in a multiple transmit buffer system.

Table 1, described in detail above with reference to timing allocation for the receive buffer, can also be used to understand timing allocation for the transmit buffer. As with the receive buffer, the basic idea for accessing the transmit buffer is to share the bandwidth of the transmit buffer in proportion to the number of dedicated lanes in each link (i.e., the "link width"). Thus, a 16× link requires all of the bandwidth, an 8× link requires half of the bandwidth, and a 4× link require one quarter of the bandwidth. The transmit buffer for a 16× link functions as a dedicated buffer and is not described in further detail.

The individual pipeline registers each generate a pipe empty signal indicating when they load their data to the link cores. For example, when pipeline register A (REG A) loads its data to link core A, a pipe empty signal generated by pipeline register A (e.g., PIPE A EMPTY) transitions to true (e.g., "logic-high"). The remaining pipeline registers B-D produce similar signals indicating when they are empty. The pipeline empty signal may be expressed as PIPE x EMPTY when referring to a non-specific one or more pipeline empty signals.

The individual link cores each generate a transmit ready signal when they are ready to transmit data. For example, link core A may cause a transmit ready signal (e.g., tx_dll_ready_a) to transition to true (e.g., "logic-high") when it sends data. The remaining link cores B-D may produce similar signals indicating when they are ready to transmit data. The transmit ready signal may be expressed as tx_dll_ready_x when referring to a non-specific one or more transmit ready signals.

A 16× link may send data to link core A on every cycle of the clock signal (e.g., Clk). Thus, the pipeline registers should be capable of being loaded with data on the same clock cycle that data is read. In this case, the PIPE A EMPTY signal never transitions to true and, thus, the tx_dll_ready_A signal is logically OR'ed with the PIPE A EMPTY signal to enable loading of the pipeline register from the transmit buffer. The PIPE A EMPTY signal is needed because the ready signal may not occur coincident with the A/D sel A signal, and the tx_dll_ready_A signal are only active for one (1) clock period on a link which is less than 16×. On a 16× link, the PIPE A EMPTY signal will not transition to true and the tx_dll_ready_A signal will not transition to false for the duration of a data packet.

Figure 8:
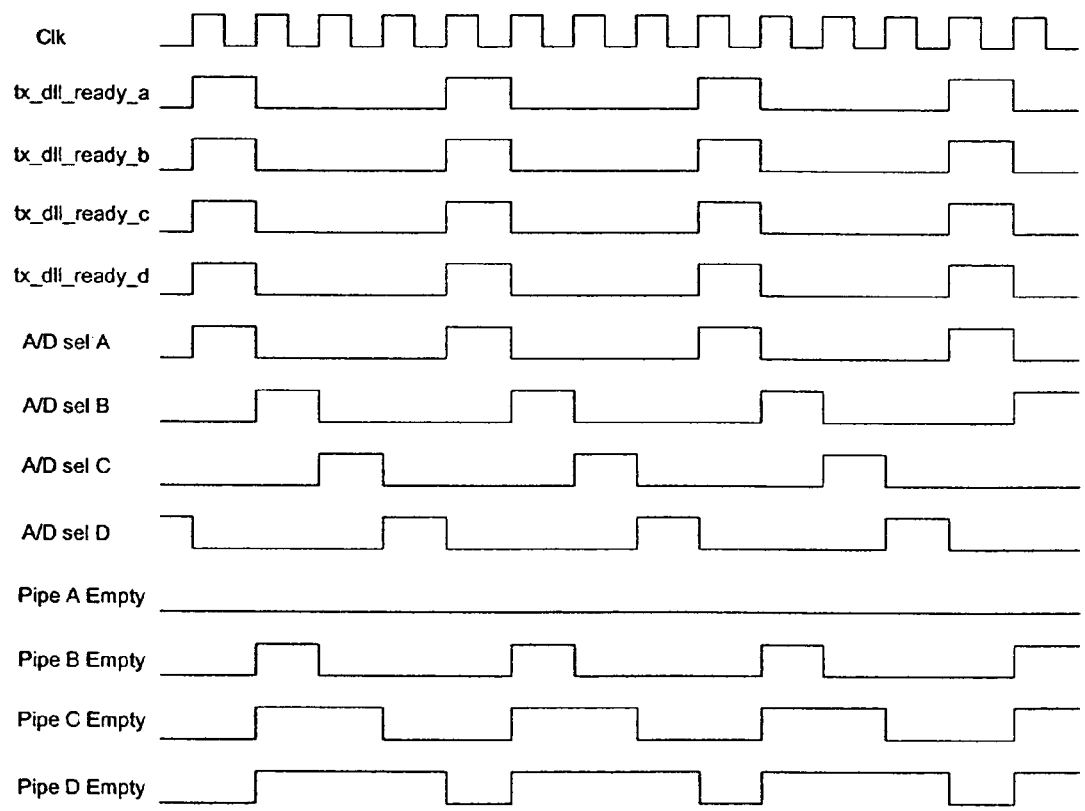
FIGS. 8 and 9 are exemplary buffer access timing diagrams for different configurations of the transmit architecture of FIG. 2 in accordance with the present invention.

FIG. 8 depicts a timing diagram for four links with each link having four dedicated lanes. In this configuration, each link core negotiates 4× dedicated lanes. In accordance with this embodiment, each link is provided equal access to data from the transmit buffer. In an exemplary embodiment, each link has access to one quarter of the addressable area within the transmit buffer.

In FIG. 8, all 4 links empty their pipeline registers to the link cores on the same clock signal (e.g., Clk). The PIPE x EMPTY signals are used in conjunction with a corresponding tx_dll_ready_x signal to indicate when the link cores are ready to accept data to enable loading of the pipeline registers.

When the A/D sel x and the PIPE x EMPTY or tx_dll_ready_x signals for a link core are true, data from the transmit buffer is loaded into the pipeline register on the leading edge of the following clock signal. The timing diagram begins with all pipeline registers not empty, which could be the start of a data packet since all pipeline registers may contain a header associated with the packet that was not loaded from the buffer. (Note: multiplexers and other control logic for header and ECC will be understood by those of skill in the art and are not shown or described herein.) In the timing diagram, PIPE A EMPTY is never "true" and, similar to the 16× link scenario, tx_dll_ready_A is always coincident with A/D sel A. This example also shows that A/D sel D occurs one clock cycle prior to the link core reading the content of the pipeline register. As a result, PIPE D EMPTY transitions to true on the leading edge of the clock following tx_dll_ready_D and stays true until the trailing edge of the next A/D sel D signal. The four (4) different link timings shown basically represent the different timing relationships that could have occurred for any of the links. It is possible for any or all links to have the same timing as any other link.

Figure 9:
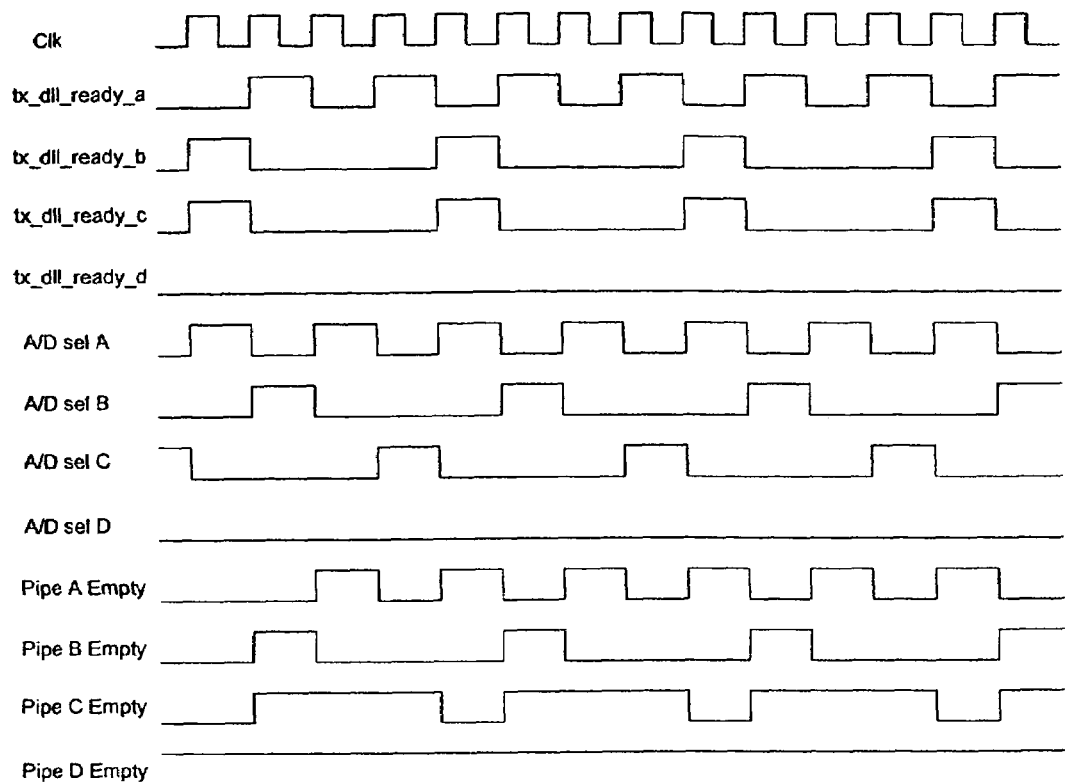

In FIG. 9, link core A negotiates 8× dedicated lanes and link cores B and C each negotiate 4× dedicated lanes. Since there are no remaining lanes, link core D is inactive. The buffer space and access time that would have been allocated to link core D, is allocated to link core A because it has a higher bandwidth than the other links. The timing diagram of FIG. 9 shows how the time division would work with 3 links (i.e., an 8× link and two 4× links). As with the four 4× links described above with reference to FIG. 8, the example starts with all active link pipeline registers not empty. The tx_dll_ready_A signal for link A transitions to an active state one clock period after the tx_dll_ready_B, C signals for links B and C. It would have been possible for the tx_dll_ready_x signals to have been in sync, but in that case it also would have been in-phase with the A/D sel A signal, and, thus, the PIPE A EMPTY signal would have always been false.

Further timing examples for the transmit architecture are not provided because the examples already described above with reference to FIGS. 3-7 for the receive architecture 100 (FIG. 1) and FIGS. 8 and 9 for the transmit architecture 200 (FIG. 2) would enable one of skill in the art to understand the present invention.

Using a single receive buffer and a single transmit buffer for multiple link cores where access to the buffers is based on the bandwidth requirements (number of dedicated lanes) of one or more remote devices coupled to the link cores rather than using a dedicated receive buffer and transmit buffer for each link core offers several advantages. First, because an address block is typically used for each buffer, silicon requirements are reduced when using a single buffer rather than multiple buffers. Second, memory capacity is better utilized regardless of the number of remote devices coupled to the link cores rather than having one or more dedicated buffers be idle if one or more link cores are unused. Finally, an asynchronous boundary is avoided through the use of the single receive buffer and the single transmit buffer that effectively acts as a clock buffer. If multiple receive buffers and multiple transmit buffers were used, each buffer would have a clock speed that was dependent on the bandwidth of the link associated with a particular buffer. The data from the different buffers would then need to be synchronized for interfacing with the controllers 130. In order to synchronize the data, the data would have to be clocked at a rate greater than the rate of the buffer with the fastest clock rate, thereby increasing system complexity.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An apparatus for use in a host device to buffer data transferred between a controller of the host device and one or more remote devices, the host device being configured to couple to each of the one or more remote devices through one or more corresponding dedicated lanes, the apparatus comprising:

a buffer that buffers data transferred between one or more remote devices and the controller of the host device when the one or more remote devices are coupled to the host device, wherein each of the one or more remote devices couple to the host device through a corresponding link including one or more dedicated lanes;

a buffer controller coupled to the buffer, the buffer controller configured to allocate access to the buffer by the data transferred between the one or more remote devices and the controller of the host device based on a number of dedicated lanes in each link corresponding to each of the one or more remote devices;

a plurality of link cores coupled to the buffer controller, the data transferred between the controller of the host device and each of the one or more remote devices when coupled to the host device passing through an associated one of the plurality of link cores; and a plurality of link trainers, each of the plurality of link trainers corresponding to one of the link cores, the link trainers configured to negotiate with the one or more remote devices when coupled to the host device to determine the number of dedicated lanes in each link corresponding to the one or more remote devices.

2. The apparatus of claim 1, wherein the buffer is a receive buffer comprising an address port and a data port and wherein the buffer controller comprises:

a plurality of pipeline registers, each of the plurality of pipeline registers corresponding to one of the plurality of link cores, the plurality of pipeline registers configured to store data from the link cores;

a receive data multiplexer coupled between the plurality of pipeline registers and the receive buffer, the receive data multiplexer selectively passing data from the pipeline registers responsive to data selection signals; and a buffer access controller coupled to the plurality of pipeline registers, the receive data multiplexer, and the plurality of link cores, the buffer access controller generating the data selection signals based on the number of dedicated lanes in each link corresponding to each of the one or more remote devices.

3. The apparatus of claim 2, wherein the buffer controller further comprises:

a plurality of address pointers, each of the plurality of address pointers corresponding to one of the plurality of link cores; and a receive address multiplexer coupled between the plurality of address pointers and the receive buffer, the receive address multiplexer selectively passing addresses from the plurality of address pointers responsive the address selection signals; wherein the buffer access controller is further coupled to the plurality of address pointers and the receive address multiplexer and is further configured to generate the address selection signals based on the number of dedicated lanes In each link corresponding to each of the one or more remote devices.

4. The apparatus of claim 1, wherein the buffer is a transmit buffer comprising an address port and a data port and wherein the buffer controller comprises:

a plurality of pipeline registers, each of the plurality of pipeline registers corresponding to one of the plurality of link cores, the plurality of pipeline registers configured to store data from the transmit buffer; and a buffer access controller coupled to the plurality of pipeline registers and the plurality of link cores, the buffer access controller generating load signals for loading data Into the plurality of pipeline registers based on the number of dedicated lanes in each link corresponding to each of the one or more remote devices.

5. The apparatus of claim 4, wherein the buffer controller further comprises:

a plurality of address pointers, each of the plurality of address pointers corresponding to one of the plurality of link cores; and a transmit address multiplexer coupled between the plurality of address pointers and the transmit buffer, the transmit address multiplexer selectively passing addresses from the plurality of address pointers responsive to address selection signals; wherein the buffer access controller is further coupled to the plurality of address pointers and the transmit address multiplexer and is further configured to generate the address selection signals based on the number of dedicated lanes in the links corresponding to each of the one or more remote devices.

6. In a computer architecture comprising a host device to buffer data transferred between a controller of the host device and one or more remote devices, wherein the host device is configured to couple to each of the one or more remote devices through one or more corresponding dedicated lanes, the computer architecture implementing a method comprising the steps of:

buffering data transferred between one or more remote devices and the controller of the host device when the one or more remote devices are coupled to the host device, wherein each of the one or more remote devices couple to the host device through a corresponding link including one or more dedicated lanes;

controlling the buffering so as to allocate access to the data transferred between the one or more remote devices and the controller of the host device based on a number of dedicated lanes in each link corresponding to each of the one or more remote devices;

transferring, via a plurality of link cores, the data transferred between the controller of the host device and each of the one or more remote devices; and negotiating with the one or more remote devices coupled to the host device, via a plurality of link trainers wherein each link trainer corresponds to one of the link cores, to determine the number of dedicated lanes in each link corresponding to the one or more remote devices.

7. The method of claim 6, further comprising the steps of:

configuring a plurality of pipeline registers to store data received from the link cores, wherein each of the plurality of pipeline registers corresponds to one of the plurality of link cores;

selectively passing data from the pipeline registers for buffering in response to data selection signals; and controlling the buffering of the passed data based upon the number of dedicated lanes in each link corresponding to each of the one or more remote devices.

* * * * *